D. J. McCORMACK.
VALVE.
APPLICATION FILED SEPT. 8, 1913.
1,188,462.
Patented June 27, 1916.
2 SHEETS—SHEET 1.
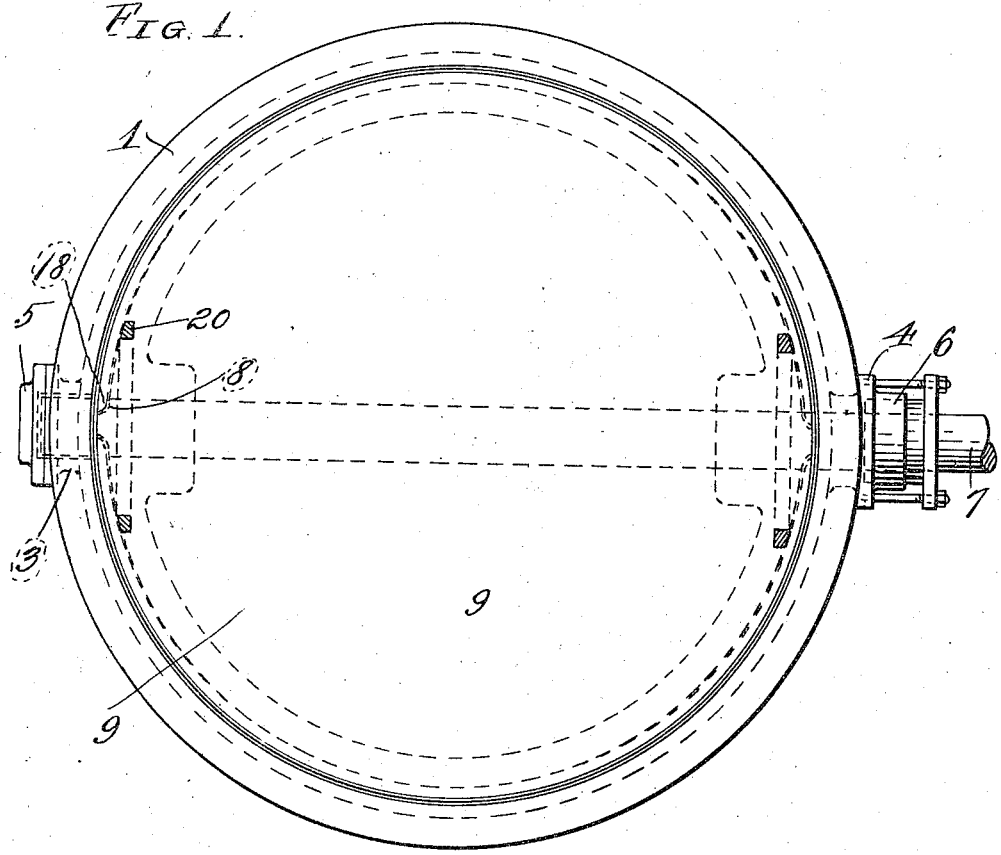
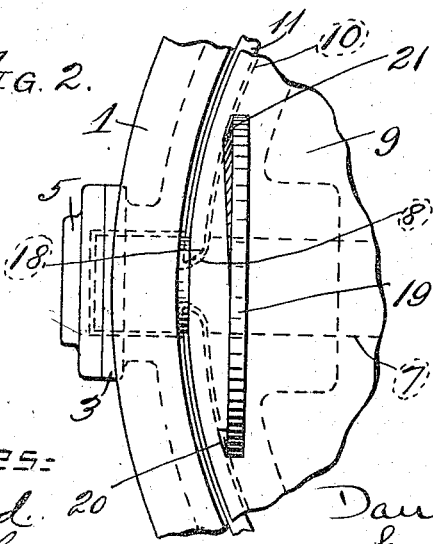
Witnesses:
A. L. Lord
C. H. Tesch
Inventor
Daniel J. McCormack
by B. V. Crockett
Atty D. J. McCORMACK.
VALVE.
APPLICATION FILED SEPT. 8, 1913.
1,188,462.
Patented June 27, 1916.
2 SHEETS—SHEET 2.
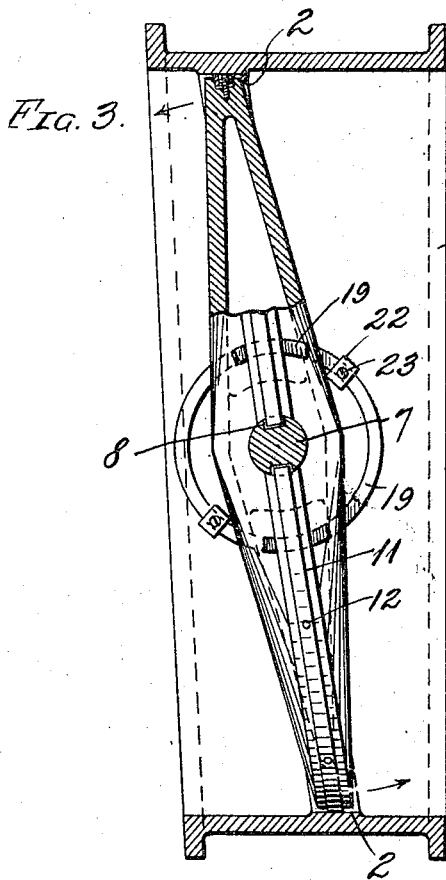
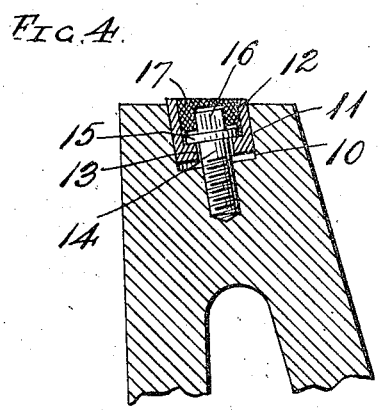
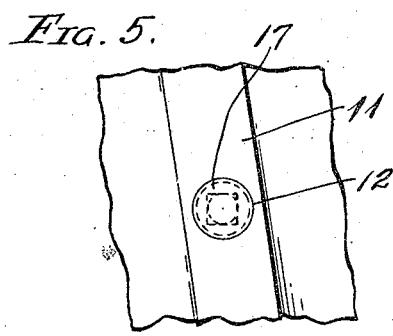
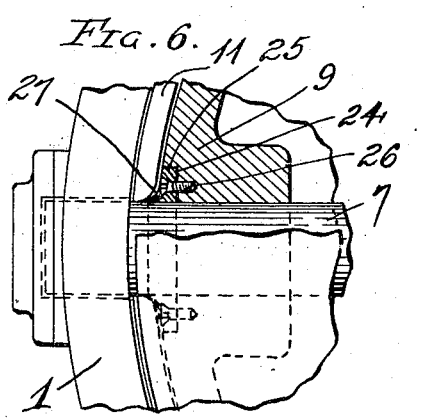
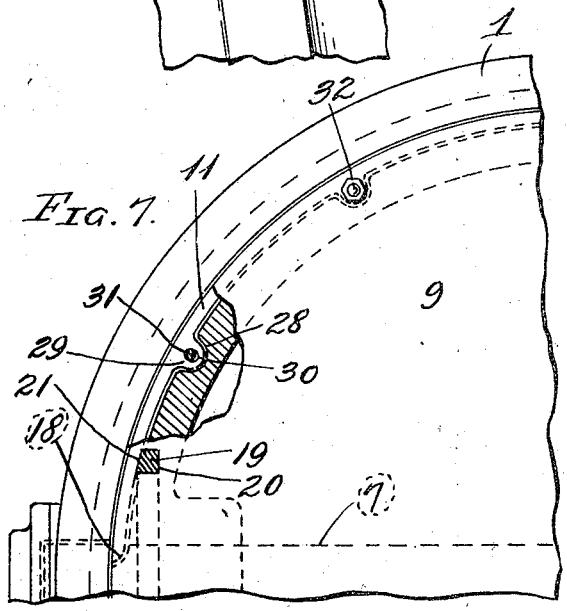
Witnesses:
A. L. Lord.
C. N. Tusch.
Inventor.
Daniel J. McCormack
by B. W. Brockett
Att'y.

UNITED STATES PATENT OFFICE.

DANIEL J. McCORMACK, OF CLEVELAND, OHIO.

VALVE.

1,188,462.  Specification of Letters Patent.  Patented June 27, 1916.

Application filed September 8, 1913. Serial No. 788,537.

*To all whom it may concern:*

Be it known that I, DANIEL JAMES MC-CORMACK, a citizen of the United States, residing at Cleveland, in the county of Cuyahoga and State of Ohio, have invented certain new and useful Improvements in Valves, of which the following is a specification.

This invention relates to improvements in valves generally and particularly to butterfly valves utilized in large installations.

More specifically the invention relates to a valve comprising a valve casing provided with diametrically opposed bearings for a butterfly valve shaft which is adapted to support within the casing a butterfly valve having a packing groove about its periphery with packing segments arranged therein and adapted to be forced or cammed out with pressure against the seating surface of the valve casing.

The invention may be further briefly summarized as consisting in the construction and combination of parts hereinafter set forth in the following description, drawings and claims.

Referring to the drawings, Figure 1 is a front elevation of the casing and valve; Fig. 2 is a detail view of means for forcing the ends of the packing segments against the valve seat in the casing; Fig. 3 is a vertical section through the device; Fig. 4 is an enlarged sectional view through the periphery showing the arrangement of the packing ring and its holding means; Fig. 5 is an elevation of a portion of the periphery of the butterly valve; Fig. 6 is an enlarged detail view showing camming blocks supplied in the butterly valve adjacent the shaft; and Fig. 7 shows a modified view of the securing means for the packing segments.

In carrying out the invention any preferred form and construction of parts may be employed so long as they possess the necessary features, but I have shown an arrangement in the drawings which is effective in operation, and in such embodiment 1 represents a suitable casing member preferably cylindrical in transverse section and is provided internally with a valve seat 2 diagonally disposed with respect to a plane cutting the longitudinal axis of the casing at right angles, as is clearly shown in Fig. 3. The casing is further provided with diametrically disposed bearings 3 and 4, the former being provided with a cap 5 and the latter being provided with a suitable stuffing box construction 6 for a purpose to be described. Mounted within these bearings is a suitable shaft 7 which is preferably provided at a point corresponding to the inner periphery of the valve seat with pockets 8 for a purpose to be described. There is a pair of these pockets on each side of the casing and they lie in the same plane. Mounted upon the shaft 7 and secured thereto in any preferred manner not shown, is a butterfly valve 9 which is slightly elliptical in plan so as to fit the seat 2 and the periphery of the valve is beveled to correspond to the valve seat 2 as is usual in valves of this type. Extending along the periphery of the valve 9 are packing recesses 10 which extend to the supporting shaft and to the pockets 8. These recesses receive packing segments 11 provided at intervals with openings 12 in the periphery and with smaller openings 13 through the inner periphery. The openings 13 receive bolts 14 provided with flanges 15 for engaging the shoulder formed by the openings 12 and 13. These bolts or screws 14 have square heads 16 by means of which they may be applied. After the bolts are applied the openings 12 are then filled by metal packing plugs 17, sufficient space being left between the head and the flange 15 of the bolt to allow movement of the segment in and out of the groove. The ends of the packing segments are curved as shown at 18 so as to coöperate with the curved faces 8 and form means for camming the ends of the packing segments outward into engagement with the valve seat, it being necessary to have the packing segments of sufficient length so that when they are moved upon the closing of the valve, the curved end portions 18 will engage with the surfaces 8 and force the rings outward and pack the valve at this point. Additional means is provided for forcing the rings outward, and it comprises an annular cam member 19 arranged to pass through suitable openings 20 above and below the shaft 7 and communicating with the packing grooves 10 of the valve. This annular cam member is provided with cam side faces 21 adapted to engage behind the rings and when held stationary to force the ends outward against the valve seat. These rings are held against rotation with the valve by means of lugs 22 secured by suitable screws 23 to the inner wall of the casing, as shown in Fig. 3.

From the foregoing it will be seen that when the valve is closed and the periphery thereof is approaching its seat the packing segments will be brought into engagement with the seat and will be forced in above and below the shaft. The forcing in of these packing segments causes their end portions 18 to engage the faces 8 and to be forced out into tight engagement with the inner wall of the valve seat, additional means being provided in the annular cam member 19 for performing this function. In use this valve seats absolutely tight with the minimum amount of leakage.

In case the pockets 8 are not formed in the shaft, and further in case the grooves are machined in the periphery of the valve, then it is necessary to supply a camming block 24 arranged in a suitable opening 25 and held therein by a screw 26. This block is provided with a camming face 27. There is one of these blocks at each point of the junction of the groove with the shaft.

In Fig. 7 a modification of the packing segment 11 is shown and in this modification the valve 9 itself is provided with recesses 28 in the bottom of the groove, and these recesses receive lugs 29 provided on the inner periphery of the segments. These lugs 29 are provided with elongated openings 30 for receiving through bolts 31 passing through the valve and provided with nuts 32 to hold them in place.

Having described my invention, I claim:—

1. In a valve, a casing, a butterfly valve mounted therein, packing segments arranged in the periphery of said valve, and means for forcing the end portions of said segments outward into engagement with the casing.

2. In a valve, a casing, a butterfly valve mounted therein, packing segments arranged in the periphery of said valve, and means for camming the end portions of said segments outward into engagement with the casing.

3. In a butterfly valve, a casing, a valve body mounted therein and provided with trunnions supported in the casing, said valve body being provided with peripheral grooves terminating near the trunnions and camming faces, and packing segments mounted in said grooves and having their ends engaging the corresponding cam faces of the valve body whereby the ends of the segments are forced outward and the intermediate portions of the segments are forced inward by the closing operation.

4. In a butterfly valve, a casing, a shaft mounted therein, a butterfly valve body mounted on said shaft and having diametrically opposed peripheral grooves extending to points near the shaft, and a yielding packing segment sprung into each of said grooves, and means for supporting said segments within the groove but permitting a slight radial movement therein.

5. In a butterfly valve, a casing, a butterfly valve structure rotatably mounted to operate within the casing, a packing groove in the periphery of said valve, and means for camming the ends of said segments outward and consisting of a cam ring mounted rigidly in the casing and adapted to engage the ends of said segments.

In testimony whereof I affix my signature in presence of two witnesses.

DANIEL J. McCORMACK.

Witnesses:
G. O. FARQUHARSON,
C. H. TRESCH.